J. I. HOKE.
TRACTION WHEEL.
APPLICATION FILED SEPT. 5, 1919.
1,425,258.
Patented Aug. 8, 1922.
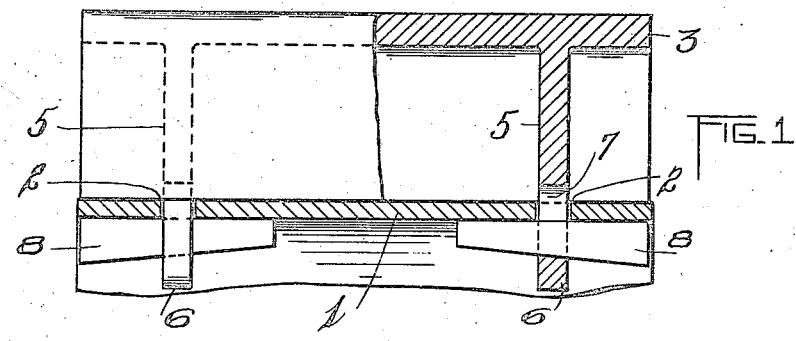
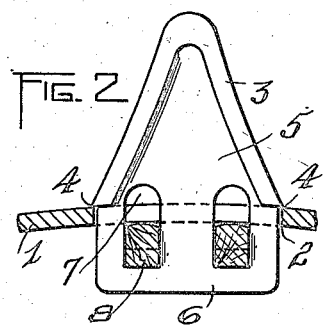
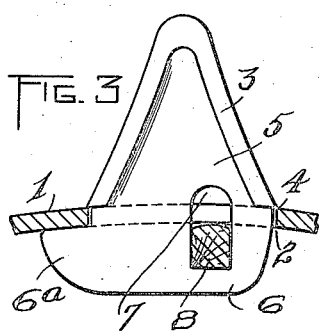
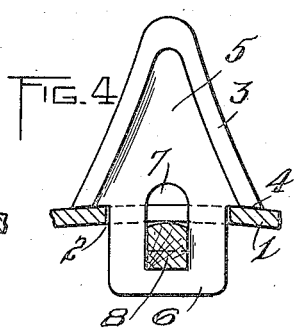
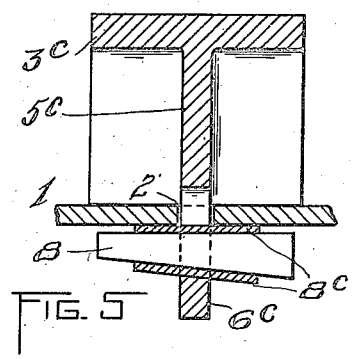
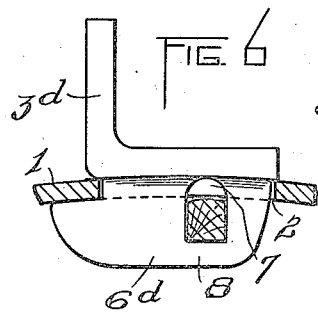
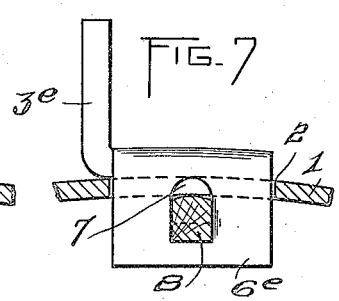
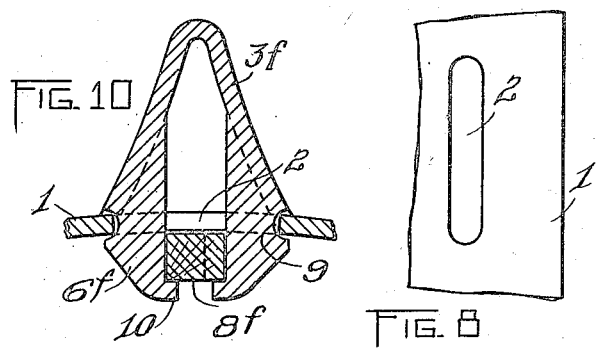
INVENTOR.
John I. Hoke
BY Davis & Simms
his ATTORNEYS.

UNITED STATES PATENT OFFICE.

JOHN I. HOKE, OF MEDINA, NEW YORK.

TRACTION WHEEL.

1,425,258.  Specification of Letters Patent.  Patented Aug. 8, 1922.

Application filed September 5, 1919. Serial No. 321,876.

*To all whom it may concern:*

Be it known that I, JOHN I. HOKE, a citizen of the United States, and resident of Medina, in the county of Orleans and State of New York, have invented certain new and useful Improvements in Traction Wheels, of which the following is a specification.

The present invention relates to traction wheels, and more particularly to the type having detachable lugs on the rims of the wheel, an object of this invention being to provide an improved lug which will not only be light and durable but which may be readily removed to permit the vehicle to travel on the rims, so that the lugs will not injure improved roadways when the tractor is being moved from place to place. Another object of the invention is to provide a securing means which will utilize a wooden key or pin for holding the lug to the rim, this key not only being readily replaceable but at the same time providing a securing means which will break before the lug or rim in the event that undue strain is placed upon the lug.

To these and other ends, the invention consists of certain parts and combinations of parts all of which will be hereinafter described, the novel features being pointed out in the appended claims.

In the drawings:—

Fig. 1 is a view showing the rim of the traction wheel in section, and a lug secured thereto being shown partially in section;

Fig. 2 shows one of the lugs in side elevation and the rim in fragmentary section;

Fig. 3 is a view similar to Fig. 2 of another embodiment of the invention;

Fig. 4 is a view similar to Fig. 2 of still another embodiment of the invention;

Fig. 5 is a detail sectional view of an embodiment of the invention wherein only one projection is employed and wear plates are arranged on opposite sides of the locking key;

Fig. 6 is a view similar to Fig. 2 of still another embodiment of the invention;

Fig. 7 is a view similar to Fig. 2 of a still further embodiment of the invention;

Fig. 8 is a fragmentary view of a portion of the rim showing one of the slots;

Fig. 9 is another view of the embodiment shown in Fig. 7; and

Fig. 10 is a sectional view of a still further embodiment of the invention.

Referring first to the embodiment shown in Figs. 1 and 2, 1 indicates a rim of a traction wheel which is provided with slots or openings 2, the length of which are extended in a peripheral direction. In this instance the rim has two slots arranged parallel and in the same axial plane. The lug is in the form of a casting having a portion 3 substantially V-shape in cross-section with its edges 4 resting against the outer periphery of the rim. This lug in this instance has two integrally formed webs or braces 5 provided with projections 6 beyond the abutting edges 4 of the lug, said projections being received in the slots 2 so as to project therethrough to the inner periphery of the rim. These projections 6 are provided with one or more, in this instance two, slots or openings 7, and in these openings are received the lockings keys 8. It is preferred to make these locking keys of wedge shape form and of wood, as it has been found that the key when made of wood is less liable to work loose, and may be more readily removed as the danger of rusting is not present. Furthermore, the user of the machine may readily make his own keys when the keys become lost or broken. It is also a result of this wooden key that it acts as a safety device and breaks whenever a strain is put thereon, which might otherwise cause the breaking of the lug or the traction wheel. The outer end of the slot or opening 7 is nearer to the outer edge of the lug than is the inner periphery of the traction wheel rim, and in this way the outer edge of the opening 7 does not interfere with the drawing of the lug to a firm seat on the rim through the wooden wedge.

The embodiment shown in Fig. 3 is the same as that shown in Fig. 2 except that only one locking key 8 is provided, and the projection 6 has a lateral forward projection 6ª which is adapted to engage the inner periphery of the rim 1 so that the strain on the wooden pin 8 is removed and the wooden pin merely serves to hold the lug to the rim. In this construction, the wooden pin does not provide a breakable connection between the lug and the rim, but it does have the non-rust advantage as well as the advantage of providing for the ready renewal in the event that the pin becomes broken.

The embodiment shown in Fig. 4 is the same as that shown in Fig. 2 except that only one opening is provided in the projection 6, and the projection as well as the lug is reduced in size.

In the embodiment shown in Fig. 5, the length of the lug 3<sup>c</sup> has been reduced and the web 5<sup>c</sup> is centrally arranged, only one being provided. The projection 6<sup>c</sup> has a wooden pin 8 extended therethrough, said pin being strengthened on opposite sides by two metallic plates 8<sup>c</sup>.

In the embodiment shown in Fig. 6, the lug is in the form of an angle iron 3<sup>d</sup>, one arm of which rests against the rim 1 while the other arm projects radially with reference to said rim. Lugs 6<sup>d</sup> project from the under side of the arm which rests against the rim, and these lugs have forward lateral extension like those shown in Fig. 3 for the purpose of removing the strain from the key or pin 8.

In the embodiment of the invention shown in Figs. 7 and 9, the lug 3<sup>e</sup> is formed from a single piece of sheet metal to provide two portions at right angles to each other, one of said portions resting against the rim 1 and the other portion projecting radially with reference to said rim. The projections 6<sup>e</sup> are extended downwardly from opposite sides of the portion which rests against the rim to project through the openings 2 in said rim. The wedges 8 operate through a single opening in each of said projections 6<sup>e</sup>.

In the embodiment of the invention shown in Fig. 10, the lug 3<sup>f</sup> is made of a malleable iron casting having an inverted V-shape form, and from the inner walls of this casting two projections 6<sup>f</sup> extend, said projections having on their outer side notches 9 and at their free ends inwardly turned projections 10. The lug is compressed so as to cause the projections 6<sup>f</sup> to pass through an opening 2 in the rim 1, after which the end walls of the opening or slot 2 are received within the notches 9. A key or pin 8<sup>f</sup> driven between the projections 6<sup>f</sup> and above the lugs 10 thereon will not only draw the lug 2<sup>f</sup> to a seat on the rim 1, but will also expand such lug so as to cause it to be retained on the rim 1 through the walls of the notches or recesses 9.

In all embodiments of the invention, a lug is provided which is held to a rim by a key or pin made of wood. This wood permits the ready removal of the lug as it will not rust, and at the same time this key provides a construction in which the user of the machine may readily form his own key from material at hand. The key also serves in some instances to provide a breakable connection which will prevent the breaking of the lug or the rim to which the lug is secured. Wood is a compressible and resilient material and its use in connection with a key for a tractor lug makes it possible to eliminate springs which have most generally been employed, while at the same time enabling the securing of a binding action not obtainable when incompressible material, such as metal is used. The lug in all forms is novel. One form is of substantially inverted V-shape in cross-section with its edges abutting the rim. Webs or braces connect the inner walls of this V-shaped member and have projections which extend through slots in the rim. These projections are provided with openings which are so formed as to permit keys to pass therethrough to draw the lugs firmly into seating engagement on the rim.

What I claim as my invention and desire to secure by Letters Patent is:—

1. A traction wheel lug formed of a casting of substantially inverted V-shape in cross-section, and provided with an integral web having a projection beyond the mouth of the V-shaped portion to connect with the traction wheel.

2. In combination with a traction wheel rim having an opening, a lug seated against the periphery of the rim and having a projection extended through the opening and provided with a forward projection engaging the inner face of the rim and provided with an opening, and a key inserted through the opening in the projection.

JOHN I. HOKE.